United States Patent [19]

Bayer et al.

[11] 4,300,110
[45] Nov. 10, 1981

[54] TRIP INTERLOCK FOR STATIC TRIP CIRCUIT BREAKERS

[75] Inventors: Eric W. Bayer, Wolcott; Edward A. Palmisano, Simsbury, both of Conn.

[73] Assignee: General Electric Company, New York, N.Y.

[21] Appl. No.: 130,320

[22] Filed: Mar. 14, 1980

[51] Int. Cl.³ .............................................. H01H 83/00
[52] U.S. Cl. ....................................... 335/6; 361/343; 200/50 B
[58] Field of Search .............. 361/339, 343, 356, 363, 361/395, 399, 115; 335/6; 200/50 R, 50 B

[56] References Cited

U.S. PATENT DOCUMENTS 4,037,184 7/1977 Kempisty et al. ....................... 335/6
4,071,722 1/1978 Hart ..................................... 361/339

Primary Examiner—B. Dobeck
Assistant Examiner—Morris Ginsburg
Attorney, Agent, or Firm—Richard A. Menelly; Walter C. Bernkopf; Philip L. Schlamp

[57] ABSTRACT

A static trip unit is comprised of a current transformer module and an electronic programmer module physically and electrically mated together for incorporation in a molded case industrial circuit breaker. Current transformer modules and programmer modules are separately interchangeable to change breaker current ratings and functional capabilities. A trip interlock is included to prevent breaker closure in the absence of either the trip unit or the trip solenoid.

9 Claims, 12 Drawing Figures

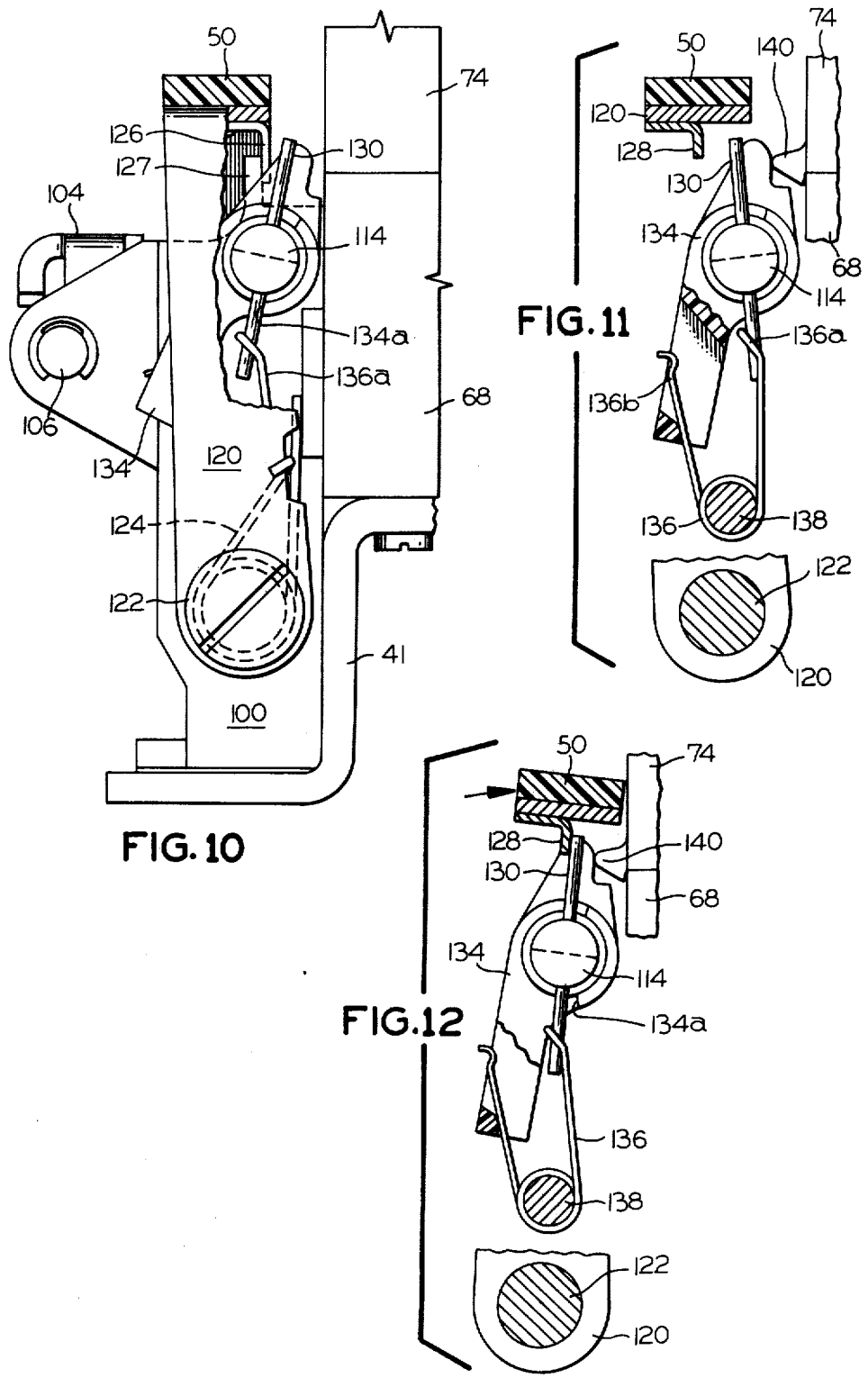

TRIP INTERLOCK FOR STATIC TRIP CIRCUIT BREAKERS

BACKGROUND OF THE INVENTION

The present invention relates to automatic molded case industrial circuit breakers and particularly to such circuit breakers having static or solid state trip units instead of the traditional thermal-magnetic trip units.

Electronic solid state trip units are increasingly being implemented in industrial circuit breakers in place of the traditional thermal and magnetic trip units to initiate circuit interruption automatically in response to an abnormal current condition in a protected load circuit. The increasing popularity of static trip units is largely due to their inherent versatility and rather precise repeatability of selected trip-time response characteristics. That is, a circuit breaker static trip unit can be designed to accommodate a wide range of user selected response characteristics calculated to establish a highly repeatable trip-time curve rather precisely tailored to a particular load so as to afford a full measure of overcurrent protection ranging from light overload to heavy short circuit proportions. Another attractive aspect of static trip units is that they can be readily and economically supplemented to also afford ground fault protection for a load circuit. In fact, the extreme versatility of modern static trip units presents a potential customer for an industrial circuit breaker with numerous options, i.e., functions, analogous to what one faces when buying a new automobile.

In applicants' commonly assigned, copending application entitled "Static Trip Unit for Molded Case Circuit Breakers" Ser. No. 130,321, filed concurrently herewith, there is disclosed and claimed a static unit assembled from interchangeable current transformer and electronic programmer modules. This modularization of the major trip unit components accommodates trip unit assembly and installation into a circuit breaker at the distributor level, thus significantly expediting customer service. Moreover, circuit breakers in the field can be readily converted and serviced by interchanging one or both of these modules. Obviously, it is critically important that both trip unit modules be present, properly assembled and correctly installed, if the circuit breaker is to perform its assigned circuit protective functions. Equally critical is the necessity that the trip solenoid be properly installed to act in tripping its circuit breaker in response to trip signals issued by the trip unit.

It is accordingly an object of the present invention to provide a trip interlock for utilization in a static trip industrial circuit breaker.

A further object is to provide a molded case industrial circuit breaker including a removable static trip unit and having a trip interlock operable to abort resetting of the circuit breaker in the event the static trip unit is not properly installed.

Yet another object is to provide a static trip circuit breaker of the above character, wherein the trip interlock further operates to abort circuit breaker resetting in the event the requisite trip solenoid is not installed in the circuit breaker.

An additional object is to provide a static trip circuit breaker of the above character wherein the trip interlock also operates to defeat circuit breaker resetting if the trip solenoid is not properly electrically connected with the static trip unit.

Still another object is to provide a trip interlock of the above character which is efficient in construction and reliable in operation.

Other objects of the invention will in part be obvious and in part appear hereinafter.

SUMMARY OF THE INVENTION

In accordance with the present invention, there is provided a trip interlock operable to guarantee the physical presence of both a removable static trip and a trip solenoid within the molded case of an industrial circuit breaker before closure of the breaker contacts can be effected. The trip interlock also insures that the requisite electrical connection between the trip unit and the solenoid is made before the circuit breaker can be put into service.

In the illustrated embodiment, the static trip unit is comprised of a current transformer module and an electronic programmer module. The current transformer module consists of a plurality of individual current transformers, one for each breaker pole, each having a closed magnetic core embracing a conductive load strap constituting a single turn primary winding. Wound on each core is a multi-turn transformer secondary winding. The current transformers are secured in spaced, side-by-side relation to the underside of an insulative support or housing which also serves to mount a circuit board in position immediately above the transverse array of current transformers. The terminations of the transformer secondary windings are brought out for electrical connection to various terminal points on the circuit board.

The programmer module includes an insulative housing in which is mounted a second circuit board carrying the electronic components, including integrated circuit components, necessary to perform the requisite static trip unit functions. Upon assembly of the programmer module to the current transformer module, electrical connectors carried by the respective circuit boards are mated, such that the transformer secondary windings are electrically connected to the programmer.

The assembled trip unit is then placed in a transversely elongated cavity provided in the molded base of the circuit breaker case in intersecting relation with the breaker pole chambers adjacent the load ends thereof. The load straps are respectively electrically connected in series with the individual pole circuits of the circuit breaker, such electrical connections also serving to physically secure the trip unit in place. Means are provided with the static trip unit for locating the mounted positions of the trip solenoid and a circuit breaker latch mechanism within the breaker molded case. Included with the latch mechanism is a trip interlock member which is normally biased to a latch defeat or tripping position effective in disabling the latch mechanism for sustaining the breaker operating mechanism in its reset condition. Included with the trip unit is a receptacle into which a plug electrically terminating the trip solenoid energizing coil is inserted to electrically connect the energizing coil into the programmer signal processing circuitry. This plug carries an activating protrusion which, while the plug is inserted in the receptacle, is in position to deflect the interlock member out of its latch defeat position, thereby enabling the latch mechanism to sustain the breaker operating mechanism in its reset position. Consequently, absent the trip unit or the trip solenoid or the failure to insert the trip solenoid plug in the trip unit receptacle, the trip interlock member assumes its latch defeat position to prevent subsequent closure of the breaker contacts. Thus the circuit breaker can not be put into service should these critical components be inadvertently omitted or the electrical connection therebetween be inadvertently neglected.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 9 is a fragmentary, exploded, perspective view of the latch mechanism of FIG. 6, illustrating the latch defeat or trip interlock components thereof;

FIG. 10 is a right side elevational view, partially broken away, of the latch mechanism of FIG. 6, seen in its latch defeated condition;

FIG. 11 is a fragmentary, right side elevational view of the latch mechanism of FIG. 6, seen in its latching or untripped condition; and FIG. 12 is a fragmentary right side elevational view of the latch mechanism of FIG. 6, seen in its response to a trip function initiated by the static trip unit via the trip solenoid.

Corresponding reference numerals refer to like parts throughout the several views of the drawings.

DETAILED DESCRIPTION

Figure 1:
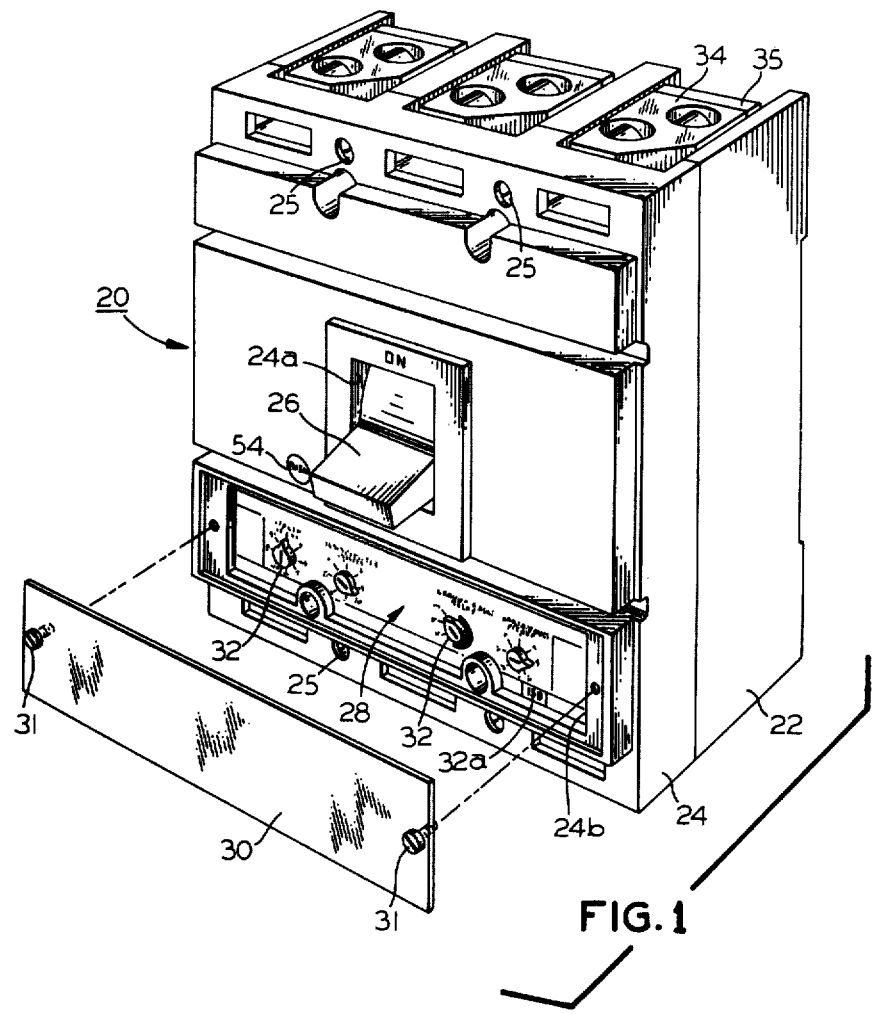
FIG. 1 is a perspective view of an industrial molded case circuit breaker incorporating the trip interlock of the present invention.

A three-pole, static trip circuit breaker, generally indicated at 20 in FIG. 1, is seen to include a molded case consisting of a base 22 and a cover 24 removably secured together by suitable means, such as screws 25. An operating handle 26 protrudes through a centrally located opening 24a in the cover front wall to accommodate manual operation of the breaker between its open and closed conditions. Adjacent the lower or load end of the breaker a transversely elongated window 24b is provided in the cover to expose the upper end surface of a static trip unit, generally indicated at 28. A window pane 30, normally secured by screws 31 in closure relation with window 24b, is removed to access control knobs 32 for adjusting the response characteristics of the static trip unit.

Figure 2:
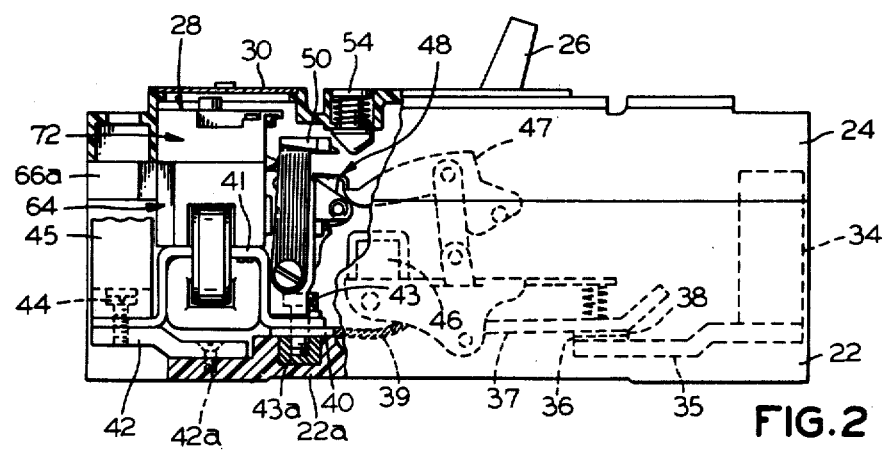
FIG. 2 is a side elevational view, partially broken away, of the circuit breaker of FIG. 1.

As seen in FIG. 2, the internal circuit for each breaker pole includes, in series, a line lug 34 secured in electrical connection with outer end of a line strap 35 which mounts at its inner end a stationary contact 36. A movable arm 37 carries adjacent its free end a movable contact 38 for engagement with the stationary contact to conduct current through the arm and a flexible braid 39 to a conductive pad 40. An inverted U-shaped load strap 41 has its inner end portion in overlapping relation with pad 40 and its outer end portion in overlapping relation with the outer end portion of a metal support pad 42 which is secured to the floor 22a of base 22 by screws 42a. The inner end portion of the load strap is clamped in electrical connection with pad 40 by a bolt 43 threaded into the tapped bore of an insert 43a anchored in the floor 22a of the base. One or more screws 44 are threaded into tapped holes in support pad 42 to clamp a load lug 45 in electrical connection with the outer end portion of load strap 41, completing the internal series circuit for one breaker pole.

Figure 3:
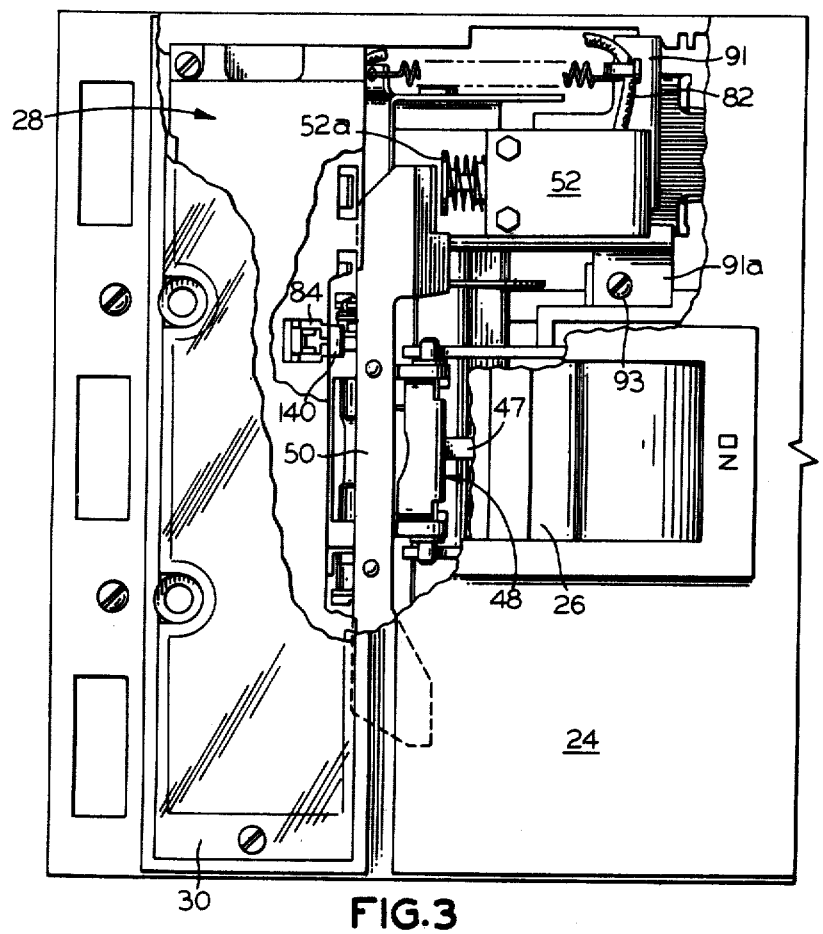
FIG. 3 is a plan view, partially broken away, of the circuit breaker of FIG. 1.

It is understood that the above-mentioned parts are duplicated in each breaker pole to provide, in the illustrated embodiment, three parallel, electrically isolated breaker pole circuits. The three movable contact arms 37 are ganged together by a crossbar 46 for concerted movement between open and closed circuit positions by a suitable operating mechanism, such as a spring powered toggle mechanism as disclosed in Jencks et al U.S. Pat. No. 3,053,954. This operating mechanism includes a cradle or trigger 47 which is releaseably held in a reset or untripped position by a latch mechanism, generally indicated at 48 in FIG. 2, so as to effect closure of the breaker contacts by handle 26. As best seen in FIG. 3, the latch mechanism includes a transversely elongated trip bar 50 which is impacted by the plunger 52a of a trip solenoid 52 upon pulsing of its coil under the control of static trip unit 28 pursuant to initiating a trip function automatically in response to an abnormal phase current condition. The solenoid plunger tripping impact induces swinging movement of the trip bar effective in conditioning latch mechanism 48 to release cradle 47, whereupon the breaker operating mechanism springs (not shown) discharge to abruptly swing movable contact arms 38 to their open circuit position. Tripping of the circuit breaker may also be precipitated manually by depression of a trip pushbutton 54 mounted by the cover as seen in FIGS. 1 and 2. The lower conical tip of the pushbutton engages trip bar 50 to induce the requisite, trip initiating swinging movement thereof.

Figure 4:
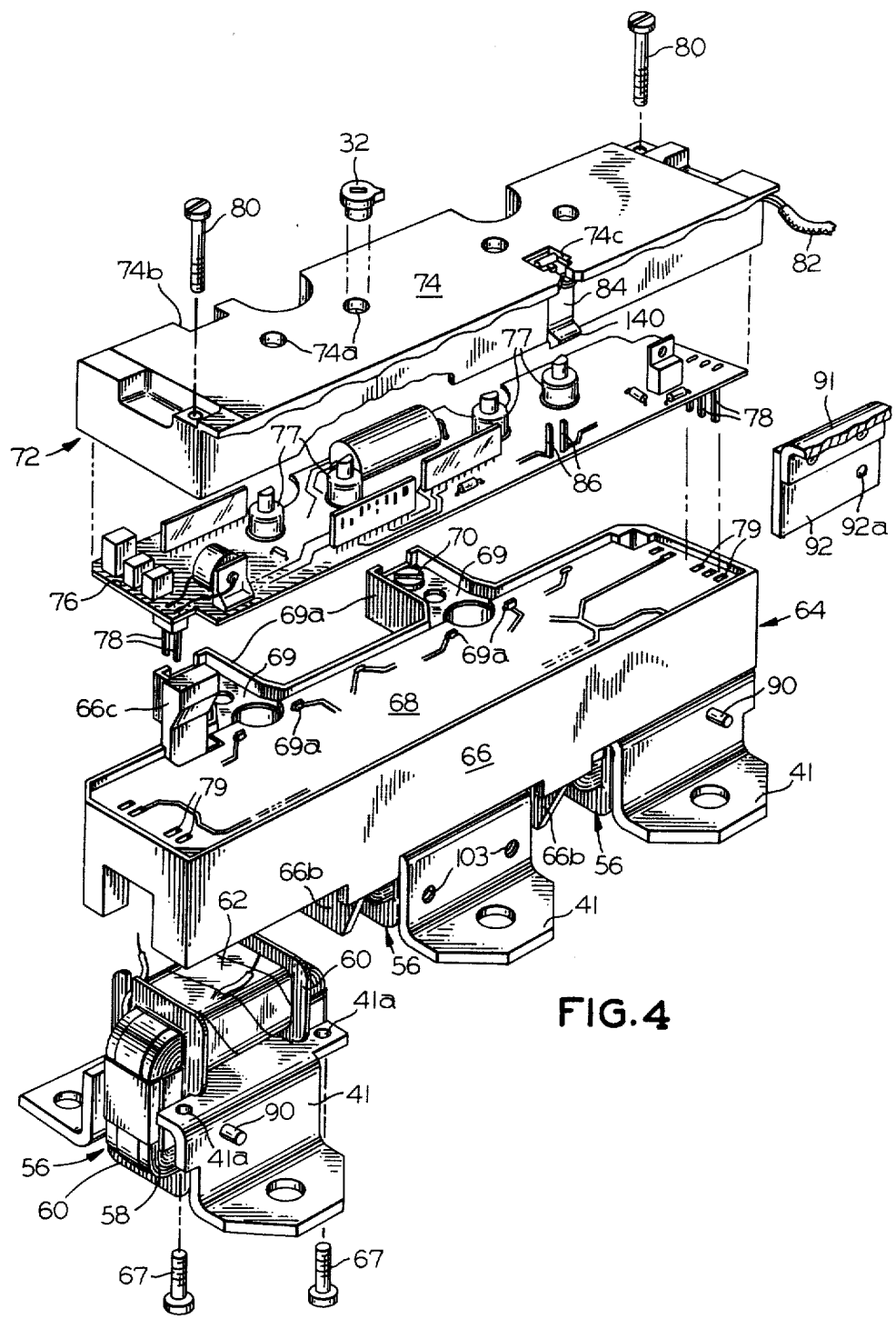
FIG. 4 is an exploded assembly view of the static trip unit removed from the circuit breaker of FIG. 1.

As seen in FIG. 4, load straps 41 in the three breaker poles are parts of the static trip unit assembly, and thus the electrical joints effected by bolts 43 and 44 seen in FIG. 2 also serve to positionally secure the trip unit in base 22 of the breaker molded case. Actually each load strap is part of a separate current transformer subassembly, generally indicated at 56 in FIG. 4 and including a generally rectangular magnetic core 58 embracing its associated load strap and in turn embraced at locations above and below the load strap by a pair of bobbins 60. Each bobbin carries a multi-turn winding 62, with the two windings electrically connected in series to provide a single current transformer secondary winding of the desired number of turns. Each load strap constitutes a single-turn primary winding carrying the phase current for the breaker pole in which it is electrically connected.

The current transformer sub-assemblies are part of a current transformer module, generally indicated at 64 in FIG. 4. This module includes an open rectangular support structure or housing 66 formed of molded insulative plastic material. The current transformer subassemblies 56 are nested into the open underside of housing 66 in side-by-side relation and secured in place by screws 67 extending through holes 41a in the load straps and threaded into preformed holes (not shown) in the housing wall. Seated on a perimetrical ledge (not shown) recessed from the upper edges of the housing sidewalls is a printed circuit board 68 having terminal points or pads to which the terminations of the three current transformer secondary winding 62 are electrically connected. This circuit board may also be provided with conductor runs and components mounted to its underside for implementing a crowbarring circuit automatically effective in dissipating dangerously high secondary voltage levels induced in secondary windings 62. As an additional feature, housing is provided with a pair of rearwardly extending projections 66a accommodating terminal strips 69 having pronged inner ends 69a rigidly solder connected to circuit board terminal pads. The outer ends of these terminal strips are equipped with binding head terminal screws 70 facilitating the electrical connection into circuit board 68 of the terminations of the secondary winding for an external neutral current transformer (not shown) when the static trip unit is designed to provide ground fault protection for a three phase load circuit including a neutral conductor. These terminal screws also serve to secure circuit board in place. Terminal strips 69 are concealed by cover 24 when secured in closure relation with base 22. Molded into housing 66 are partitions and depending barriers 66b serving to provide interphase isolation between adjacent current transformer sub-assemblies 56.

Completing the static trip unit assembly is a programmer module, generally indicated at 72 in FIG. 4. This module includes a shallow rectangular support structure or housing 74 formed of molded insulative plastic. Captured within the open bottom of this housing is another printed circuit board 76 which carries conductor runs, discrete components, integrated circuit chips, etc., making up signal processing circuitry for performing the various circuit protective functions called for. The upper wall of housing 74 is suitably apertured, as indicated at 74a, to accommodate the protrusion of the control shafts for various switches 77 mounted by circuit board 76. The exposed upper ends of these shafts carry the control knobs 32 seen in FIG. 1. Also carried by circuit board 76 are a plurality of depending male pin connectors 78 which mate with female pin connectors 79 when programmer module 72 is seated atop current transformer module 64. The currents developed in the various current transformer secondary windings 62 by the phase currents flowing through load straps 41 are routed by circuit board 68 and the mated pin connectors 78, 79 to the programmer circuit board 76. These secondary currents provide operating power for the programmer electronics and signals indicative of the phase current magnitudes which are processed by the programmer electronics pursuant to determining if and when a trip function is to be initiated. The assembly of the programmer and current transformer modules is secured by screws 80 passing through clearance holes in programmer module housing 74 and threaded into preformed bores in current transformer module housing 66. Molded with the latter housing is an upstanding projection 66c which, upon assembly of the two modules, is received in a notch 74b formed in programmer module housing 74. The flat upper surface of this projection is flush with the upper surface 74 and receives a label 32a seen in FIG. 1, identifying a current rating for the current transformers as determined by their turns ratio. This current rating corresponds to the continuous current rating of the circuit breaker and establishes the current magnitude factor to which the adjustable programmer current settings are calibrated.

From the description thus far, it is seen that by modularizing static trip unit 28 into separate programmer and current transformer modules which themselves are readily interchangeable, manufacturing and stocking economies are achieved. Thus, a circuit breaker can be economically produced on essentially a shop order basis taking from stock the current transformer module having the current rating specified by the customer and the programmer module having the specified functional capabilities, assembling the modules into a static trip unit, and then installing the trip unit in the breaker molded case. In fact, these operations may be performed at various distributor locations, rather than at a single factory location. Moreover, current transformer modules may be interchanged to change a particular breaker's continuous current rating within the limits of its frame size. Programmer modules may be interchanged to add or subtract functions, such as ground fault protection, short time pickup and delay, fault indication, etc. Economies in field servicing are also achieved since, in all likelihood, only one of the two trip unit modules need be replaced to rectify any trip unit field problem.

Figure 5:
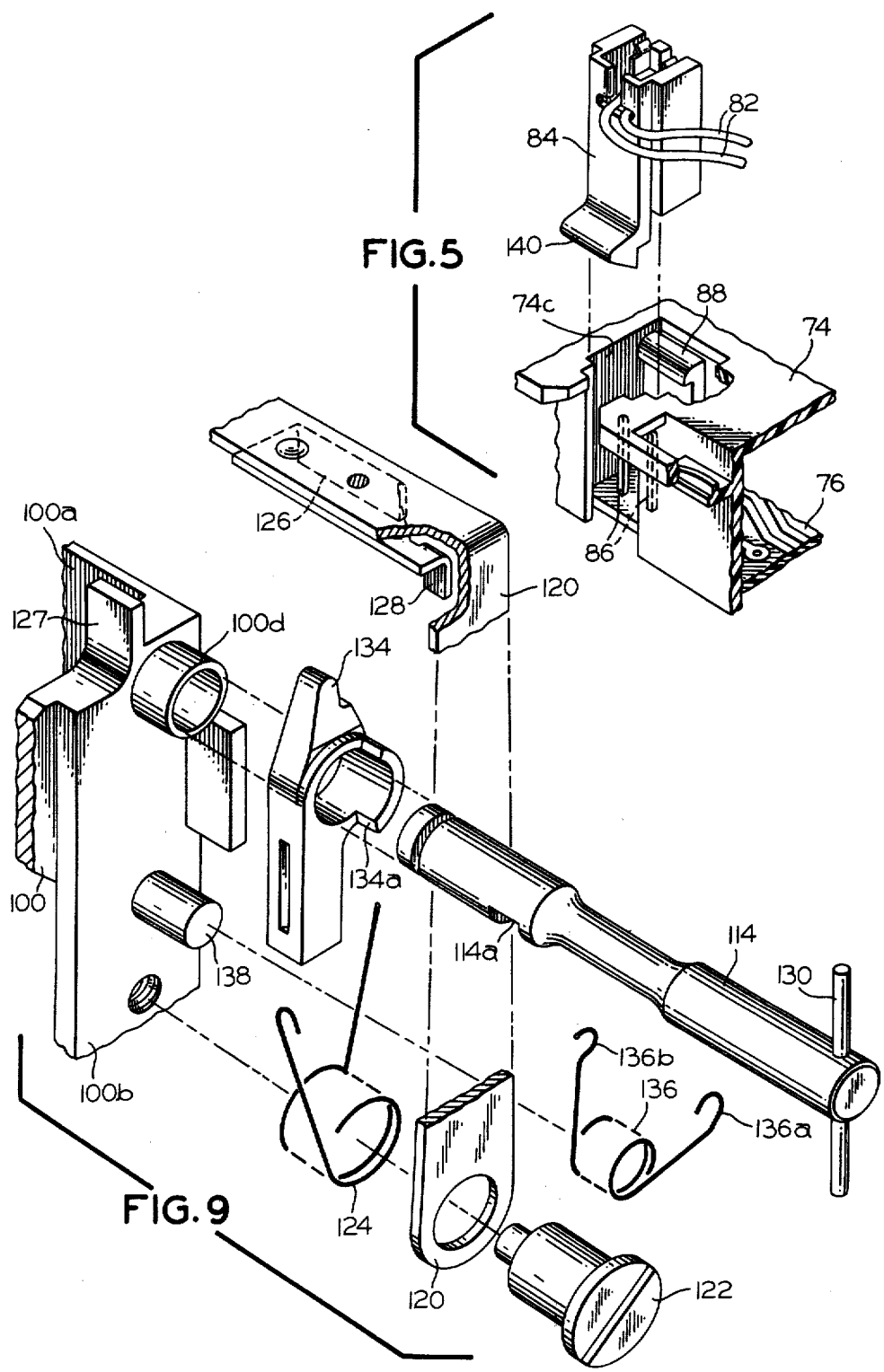
FIG. 5 is a perspective view of the trip interlock actuator utilized in the circuit breaker of FIG. 1 as the interlock interface between a circuit breaker latch mechanism, a trip solenoid and the static trip unit.

Trip solenoid 52, seen in FIG. 3, has its energizing coil terminations brought out via wires 82 to a plug connector 84 seen in FIGS. 4 and 5. This plug connector is slidingly received in a socket or receptable 74c molded into programmer module housing 74. Wires 82 are terminated in separate female pin connectors for electrical engagement with a pair of upstanding male pin connectors 86 carried by programmer circuit board 76 as the plug connector is slid downwardly into receptacle 74c. The trip solenoid is thus wired into the programmer, ready to initiate a trip function in response to a trip signal pulse generated by the programmer electronics. The connected position of plug 84 in recess 74c is releasably sustained by a resilient hook 88 (FIG. 5) molded into programmer module housing 74.

To facilitate positional mounting of the trip solenoid in one outside pole of the circuit breaker, a pin 90 (FIG. 4) is press-fitted in a hole provided in the load strap 41 stationed in that breaker pole. A bracket 91 (FIG. 3), supporting the trip solenoid, is provided with a depending flange 92 (FIG. 4) having a hole 92a into which pin 90 is inserted to positionally locate the free end of plunger 52a in confronting relation with trip bar 50. A bolt 93 (FIG. 3) projecting through a hole in a laterally turned flange 91a of bracket 91 and threaded into the breaker base, serves to secure the operational position of the trip solenoid. As seen in FIG. 4, the other outside pole load strap may also be equipped with a pin 90 serving to positionally locate a shunt trip or undervoltage release solenoid accessory (not shown) in this breaker pole in the same manner as the trip solenoid 52 in the other outside pole. The accessory solenoid plunger would also act on the trip bar 50 to trip the circuit breaker.

Latch mechanism 48, seen in FIGS. 2 and 3, will now be described in greater detail in conjunction with FIGS. 6 through 12. Thus the latch mechanism includes a supporting frame 100 (FIGS. 6, 9 and 10) having a back wall 100a, opposed sidewalls 100b and a bottom wall 100c. Bolts 102, extending through holes in the frame backwall, are threaded into tapped holes 103 (FIG. 4) provided in the center pole load strap 41. Also, bolt 43, making the electrical joint between the center pole load strap 41 and center pole conductive pad 40, extends through a hole in the frame bottom wall, thereby fixedly securing the latch mechanism in place in the center pole region of the circuit breaker. A primary latch 104 is pivotally and slidably mounted by a transverse pin 106 mounted by the frame sidewalls 100b. Torsion springs 108 bias the primary latch both rightwardly and in the clockwise direction, as viewed in FIGS. 7 and 8, into position to latchably engage the tip of cradle 47 (FIG. 2) pursuant to retaining the breaker operating mechanism in its reset condition. Counterclockwise torque exerted on the primary latch by the operating mechanism springs is normally resisted by a roller pin 110 carried by a secondary latch 112 pivotally mounted by a pin 113 carried by latch mechanism frame 100. The resulting counterclockwise torque exerted on the secondary latch is normally resisted by a transverse latch pin 114 rotatably mounted between the frame sidewalls. More specifically, as seen in FIG. 7, the upper tip 112a of the secondary latch normally engages the periphery of the latch pin at a longitudinal location aligned with a notch 114a formed therein. It is thus seen that when the latch pin is rotated in the counterclockwise direction, the secondary latch tip 112a rides off the latch pin periphery into the space left by notch 114a. The secondary latch is thus unlatched and free to pivot in the counterclockwise direction. The unlatching restraint imposed on the primary latch by the secondary latch roller pin 110 is thus removed, and the primary latch is freed to pivot in the counterclockwise direction. Cradle 47 is thus released to swing in the clockwise direction viewed in FIG. 2, and the circuit breaker is tripped to effect abrupt separation of the breaker contacts.

Figure 6:
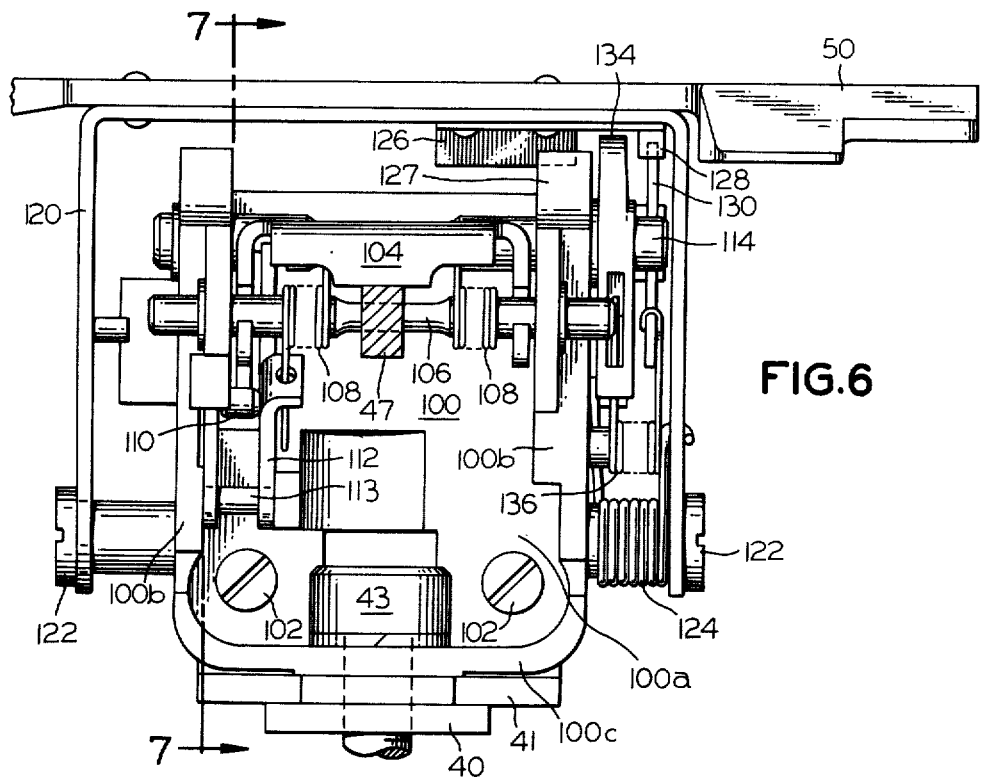
FIG. 6 is a front view of the latch mechanism utilized in the circuit breaker of FIG. 1.
Figure 7:
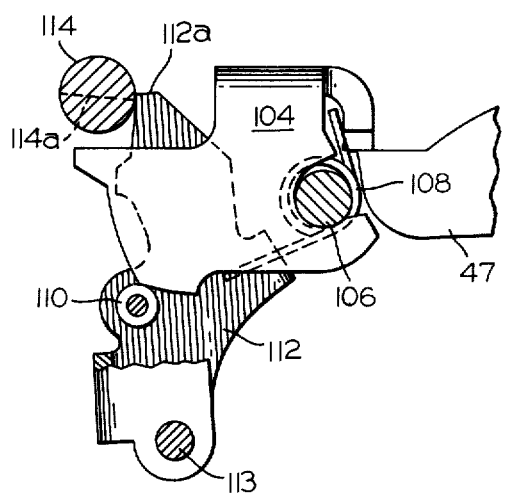
FIG. 7 is a sectional view of the latch mechanism taken along line 7—7 of FIG. 6, seen in its latching or untripped condition.
Figure 8:
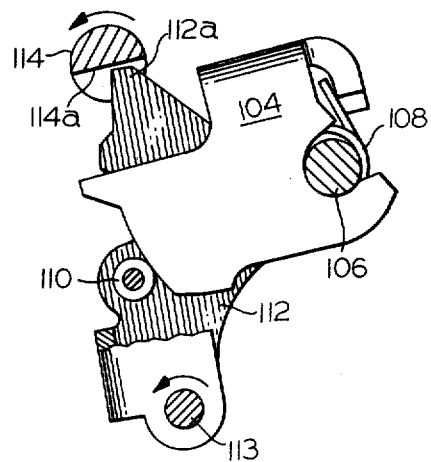
FIG. 8 is a sectional view of the latch mechanism taken along line 7—7 of FIG. 6, seen in its unlatched or tripped condition.

Trip bar 50 is mounted by a bail 120 pivotally mounted adjacent its ends by screws 122 threaded into the frame sidewalls 100b, as seen in FIG. 6. This bail, also seen in FIGS. 9 through 12, is biased in the counterclockwise direction by a torsion spring 124 to a quiescent position determined by the abutment of a bail mounted tab 126 against a stop 127 (FIGS. 6 and 11) carried by frame 100. Also mounted by bail 120 is a depending trip tab 128 (FIGS. 9, 11 and 12) positioned in confronting relation with the upper end of a trip pin 130 radially mounted by latch pin 114 adjacent its right end as seen in FIG. 6.

From the foregoing description, it is seen that when the trip solenoid coil is pulsed by a trip signal generated by the programmer, its plnger 52a (FIG. 3) springs out into tripping impact with trip bus 50. As viewed in FIGS. 11 and 12, bail 120 is thus pivoted in the clockwise direction, swinging trip tab 128 rightwardly to pick up the upper end of a trip pin 130 and induce an increment of clockwise rotation of latch pin 114 sufficient to unlatch secondary latch 114 (FIGS. 7 and 8) and precipitates tripping of the circuit breaker.

It will be appreciated that should the circuit breaker 20 be put into service without either programmer module 72 or trip solenoid 52 in place, its ability to provide any form of circuit protection is lost. Absent the programmer module, there is no means to process the current transformer secondary signals. On the other hand, if the trip solenoid is absent or not wired into the programmer module electronics, there is no means to act in response to programmer generated trip signals. To guard against the potentially hazardous consequences attending the inadvertent failure to install these components, a trip interlock lever 134 is journalled on bushing 100d carried by the right frame sidewall 100b as best seen in FIG. 9. A torsion spring 136, carried by a pin 138 mounted by the right frame sidewall, has its one end 136a hooked on the lower end of trip pin 130 and its other end 136b acting on the lower end of trip interlock lever 134, as best seen in FIGS. 11 and 12. Acting on the upper end of the trip interlock lever is a nose 140 which is integrally molded with the body of plug connector 84 (FIG. 5.). However, if either the programmer module or the trip solenoid, or both are not installed, or they are both installed but the plug connection wiring the trip solenoid into the programmer electronics has not been made, nose 140 is obviously absent. This situation is depicted in FIG. 10. Spring 136 rotates trip interlock lever 134 in the clockwise direction, and this motion is communicated to latch pin 114 by the engagement of a hub shoulder 134a of the interlock lever with trip pin 130. The latch pin is thus angularly oriented to its tripping position seen in FIG. 8. Consequently, all restraints against counterclockwise pivotal movement of primary latch 104 are moved, and it is incapable of sustaining cradle 47 in its reset position. Thus, the breaker operating mechanism can not be reset, a prerequisite to subsequent closure of the breaker contacts.

On the other hand, when plug connector 84 is fully inserted into receptacle 74c provided in programmer module housing 74 to electrically connect the trip solenoid with the programmer electronics, conditions seen in FIGS. 11 and 12 are achieved. Specifically, nose 140 of the plug connector engages the upper tip of the trip interlock lever to rotate this lever in the counterclockwise direction. This motion is coupled to latch pin 114 by spring 136, which is then rotated in the counterclockwise direction to its latching angular position seen in FIG. 7. The secondary latch tip 112a then engages the latch pin periphery, enabling the primary latch to hold the cradle in its reset position when the breaker operating mechanism is manually reset by handle 26.

It will thus be seen that the objects set forth above, among those made apparent in the preceding description, are efficiently attained and, since certain changes may be made in the above construction without departing from the scope of the invention, it is intended that all matter contained in the above description or shown in the accompaning drawings shall be interpreted as illustrative and not in a limiting sense.

Having described my invention, what I claim as new and desire to secure by Letters Patent is:

1. In combination with a molded case industrial circuit breaker having a latch mechanism for releaseably sustaining a breaker movable contact operating mechanism in its reset condition requisite to subsequent breaker contact closure, a static trip unit removably mounted with the breaker molded case, and a trip solenoid separately removably mounted within the breaker molded case in position to induce, in response to electrical activation of its energizing coil under the control of the trip unit, tripping action of the latch mechanism pursuant to releasing the breaker operating mechanism from its reset condition and thereby produce abrupt breaker contact opening, a trip interlock comprising, in combination:

A. an electrical receptacle carried by the trip unit and electrically connected into signal processing circuitry of the trip unit;

B. a plug electrically terminating the energizing coil of the trip solenoid, said plug being inserted into said receptacle to electrically connect the energizing coil into the signal processing circuitry;

C. a trip interlock member included in the latch mechanism, said member normally biased to a latch defeat position disabling the latch mechanism from sustaining the breaker operating mechanism in its reset condition; and D. a trip interlock actuator carried by said plug, with said plug inserted in said receptacle, said actuator assuming a position of engagement with said trip interlock member effective in displacing same from its latch defeat position and thereby enabling the latch mechanism to sustain the breaker operating mechanism in its reset condition.

2. The trip interlock defined in claim 1, wherein said receptacle is in the form of a socket recessed in a portion of a housing for the static trip unit.

3. The trip interlock defined in claim 2, wherein said receptacle further includes detent means formed with the trip unit housing portion for releaseably, engageably detaining said plug in said receptacle.

4. The trip interlock defined in claim 1, wherein said trip interlock actuator consists of a protuberance formed on the body of said plug.

5. The trip interlock defined in claim 1, wherein said trip interlock member is mounted by the latch mechanism for pivotal movement into and away from its latch defeat position, said member coupled with a latch element of the latch mechanism such as to urge the latch element to a trip precipitating position upon being biased to its latch defeat position, said trip interlock further including spring means biasing said trip interlock member to its latch defeat position and biasing the latch element from its trip precipitating position to a latching position enabling the latch mechanism to sustain the reset condition of the breaker operating condition when said trip interlock actuator displaces said trip interlock member from its latch defeat position.

6. The trip interlock defined in claim 4, wherein said receptacle is in the form of a socket recessed in a portion of a housing for the static trip unit.

7. The trip interlock defined in claim 6, wherein said receptacle further includes detent means formed with the trip unit housing portion for releaseably, engageable detaining said plug in said receptacle.

8. The trip interlock defined in claim 7, wherein said trip interlock member is mounted by the latch mechanism for pivotal movement into and away from its latch defeat position, said memeber coupled with a latch element of the latch mechanism such as to urge the latch element to a trip precipitating position upon being biased to its latch defeat position, said trip interlock further including spring means biasing said trip interlock member to its latch defeat position and biasing the latch element from its trip precipitating position to a latching position enabling the latch mechanism to sustain the reset condition of the breaker operating condition when said trip interlock actuator displaces said trip interlock member from its latch defeat position.

9. In combination with a molded case industrial circuit breaker having a latch mechanism for releaseably sustaining a breaker movable contact operating mechanism in its reset condition requisite to subsequent breaker contact closure, a static trip unit removably mounted with the breaker molded case, and a trip solenoid separately removably mounted within the breaker molded case in position to induce, in response to electrical activation of its energizing coil, tripping action of the latch mechanism pursuant to releasing the breaker operating mechanism from its reset condition and thereby produce abrupt breaker contact opening, a trip interlock comprising, in combination:

A. an electronic programmer module removably incorporated in the trip unit as an essential functional component thereof, said programmer module including an electrical receptacle electrically connected into signal processing circuitry thereof;

B. a plug electrically terminating the energizing coil of the trip solenoid, said plug being inserted into said receptacle to electrically connect the energizing coil into said programmer module signal processing circuitry;

C. a trip interlock member included in the latch mechanism, said member normally biased to a latch defeat position disabling the latch mechanism from sustaining the breaker operating mechanism in its reset condition; and D. a trip interlock actuator carried by said plug, whereby, with said plug inserted in said receptacle, said actuator, assuming a position of engagement with said trip interlock member effective in displacing same from its latch defeat position and thereby enabling the latch mechanism to sustain the breaker operating mechanism in its reset condition.

* * * * *